July 26, 1949.  C. W. BAKER  2,477,037
ANNULAR CUTTER
Filed June 15, 1948

Inventor
Corwin W. Baker
By his Attorney

Patented July 26, 1949

2,477,037

UNITED STATES PATENT OFFICE

2,477,037

ANNULAR CUTTER

Corwin W. Baker, Beverly, Mass., assignor to United Shoe Machinery Corporation, Flemington, N. J., a corporation of New Jersey Application June 15, 1948, Serial No. 33,205

5 Claims. (Cl. 12—82)

The purpose of this invention is to provide improvements in tapered annular cutters such, for example, as those commonly used in machines of the type illustrated in United States Letters Patent No. 1,226,872, granted May 22, 1917, on application of Andrew Eppler. Such machines are used to trim the inseams of welt shoes, and in the process of doing so the cutters thereof encounter many lasting staples or tacks and soon become dulled thereby, especially if they are made of the kind of steel that may be bent to transform a thin flat blank into a conical annulus, as represented in the patent above mentioned. After a cutter blank of that type has been bent to the required form, its meeting edges must be welded to each other, the welded seam or joint dressed to remove surplus metal, the interior of the annulus machined with a milling cutter to form flutes, and the fluted annulus hardened and tempered. Some of the technical difficulties incidental to making cutters in that manner are set forth in United States Letters Patent No. 1,720,769, granted July 16, 1929, on application of R. O. Stephenson.

To avoid those difficulties and, at the same time, to facilitate making tapered annular cutters of more durable steel without bending, straining, or welding the latter, the present invention provides a novel construction whereby an annular cutting edge comprising a series of scallops may be obtained with a plurality of individual flat cutting bits or blades so shaped and assembled as to form a hollow truncate pyramid. Although the cross-section of such a cutter is essentially polygonal both inside and outside, a truly annular cutting edge may be formed at the larger end of the cutter by grinding a narrow concentric circular band on the outer faces of the blades.

Another novel feature of the invention is embodied in a combination of cooperative clamping members constituting a stock by which all the flat bits or blades of an annular cutter are maintained in pyramidal relation. One of these clamping members is provided with exterior facets forming a truncate pyramid, each facet providing a seat for the inner face of the shank of one blade. The other one of the clamping members is provided with an interior truncate conical surface having an angle of taper corresponding to that of the pyramidal clamping member.

Referring to the drawings.

Figure 5:
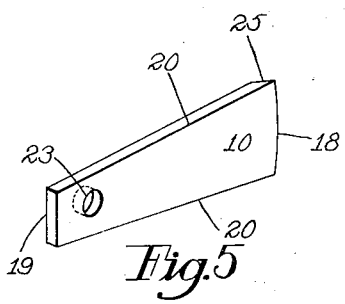
Fig. 5 is a perspective view of one of the blades.
Figure 3:
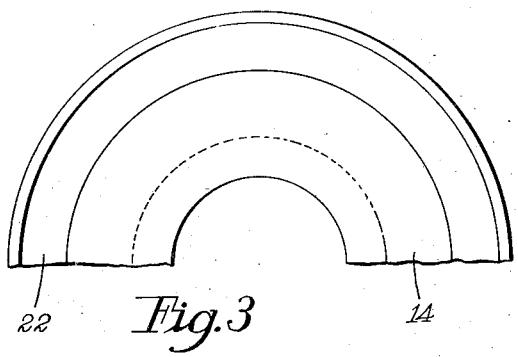
Fig. 3 is an end elevation of a segment of the outer blade-clamping member.
Figure 4:
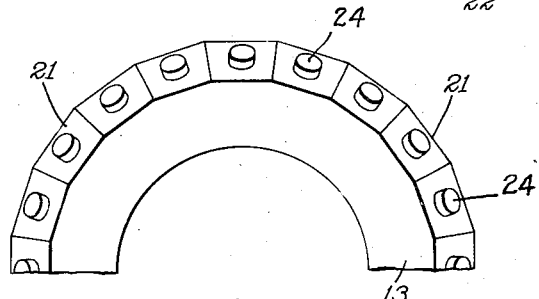
Fig. 4 is an end elevation of a segment of the inner blade-clamping member.

A cutter assemblage embodying the invention comprises a plurality of uniform individual flat blades 10, preferably made of high-speed steel, and a stock by which they are carried and maintained in the form of a hollow truncate pyramid. The stock is preferably designed to facilitate attaching and detaching the blades 10. It comprises a hub 11, a nut 12 engaging a thread on the hub, an inner clamping member 13 and an outer clamping member 14. The hub is provided with an internal circular bearing surface 15 adapted to establish an axis of rotation indicated by line X—X in Fig. 1. The hub is adapted to be mounted on a dead spindle 16 in an inseam-trimming machine in the manner illustrated in Fig. 9 of the aforesaid Eppler Patent No. 1,226,872, and is provided with gear teeth 17 by which it may be rotated.

Figure 1:
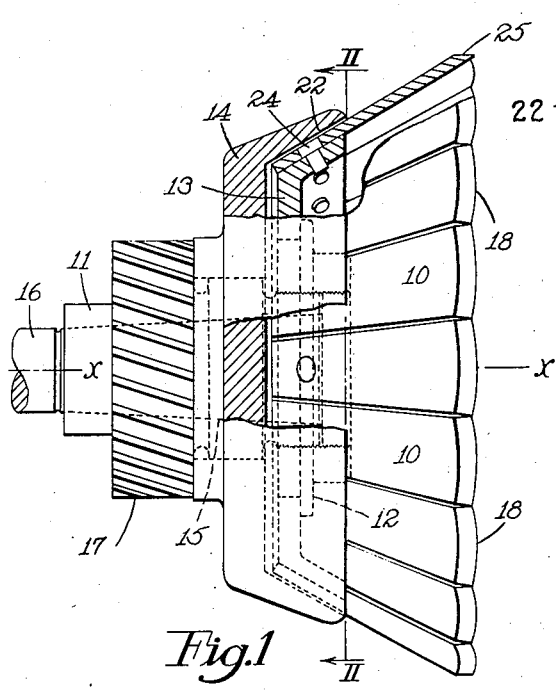
Fig. 1 is a front elevation, partly broken away, of a cutter assemblage embodying the invention.

To provide necessary clearances in a machine of the type under consideration, the cutter assemblage is tapered as illustrated in Fig. 1, its larger end being defined by an endless series of outcurved segmental cutting edges 18 provided one by each blade 10. All portions of the composite cutting edge thus formed are equidistant from the axis of rotation, although they do not lie all in one plane.

Each blade has a narrow shank end 19, a wider cutting end, and two straight side edges 20, 20 converging from the cutting end to the shank end.

Figure 2:
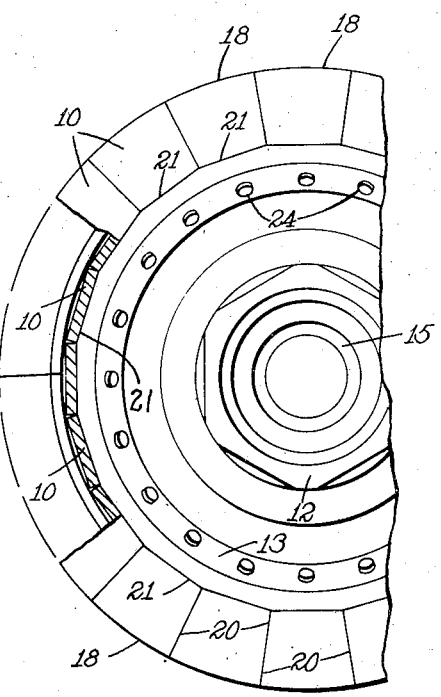
Fig. 2 is an end elevation thereof, except the portion in section in the plane of line II—II in Fig. 1.

The inner clamping member 13 is provided with a series of blade-engaging facets 21 that give it the form of a truncate pyramid, and they are surrounded by an interior frusto-conical blade-engaging surface 22 of the outer clamping member 14. The proportions, angles and dimensions of the clamping members and of the blades are coordinated to maintain the latter in the form of a hollow truncate pyramid and to maintain their converging edges 20 in abutting relation (Fig. 2). Consequently, when the assemblage is intact and the clamping members are set up tightly against the blades, each blade is braced against sidewise displacement and skewing by the two blades that flank it.

The blades and one of the clamping members are preferably provided with interlocking formations adapted to prevent the blades from creeping out of their allotted places. For this purpose the shank portion of each blade may be provided with a small round hole 23 and one of the clamping members may be provided with a series of anchoring studs 24 adapted to project into the holes. The drawings represent the studs as fastened to the member 13 by being pressed into tightly fitting bores therein.

The blades may be assembled and clamped in the stock before their cutting ends are provided with cutting edges. To form the cutting edges the assemblage will be rotated about its axis while an abrading wheel is operated to generate a convex exterior bevel 25 that intersects the interior faces of all the blades. The surface 25 generated by the abrading wheel is preferably cylindrical, and the bevel thereby formed is due to the convergence of the blades. Furthermore, since the interior faces of the blades are flat, the result of beveling the outer faces as specified is an annular cutting edge having outcurved scallops.

Having thus described my invention, what I claim as new and desire to secure by Letters Patent of the United States is:

1. An annular cutter comprising a plurality of individual flat blades each having a wide cutting end, a narrow shank end and two straight converging side edges, and means constituting a stock to which the narrow ends of said blades are fastened side by side in a series in the form of a hollow truncate pyramid in which said converging edges abut one another, the wide end of each blade having an exterior convex bevel intersecting the interior flat face thereof and forming a curved cutting edge.

2. An annular cutter comprising a stock having a circular bearing surface adapted to establish an axis of rotation, and a plurality of individual flat blades fastened in edge-to-edge relation to said stock in an endless series forming a truncate pyramid concentric with said axis, said blades having each a cutting edge at one end and forming, collectively, an annular cutting edge all portions of which are equidistant from said axis.

3. An annular cutter comprising an outer clamping member having an interior frusto-conical surface, an inner clamping member having a series of exterior facets forming the sides of a truncate pyramid and surrounded by said frusto-conical surface, a series of uniform individual flat blades seated respectively on said facets and having straight converging edges abutting one another, and means by which said clamping members are maintained against said blades with clamping pressure, said blades projecting from said clamping members and forming a hollow truncate pyramid having a circular exterior bevel at its larger end intersecting the interior flat faces of the blades, said bevel and said interior faces forming an annular cutting edge having outcurved scallops.

4. An annular cutter comprising a stock member having a series of exterior facets forming a truncate pyramid, a series of individual flat blades each having a shank end, a wider cutting end and two straight edges converging from the cutting end to the shank end, the shank portions of said blades being seated on said facets, respectively, and said straight edges lying one against another, said stock member and the shank portions of the blades having interlocking formations, and means by which said stock member and the blades are maintained in interlocking relation, the cutting ends of the blades having curved cutting edges forming, collectively, an endless cutting edge all portions of which are equidistant from the axis of the pyramid.

5. A composite cutter comprising a series of uniform individual blades each having a narrow shank end, a wider cutting end and straight converging side edges, and two cooperative members by which the blades are clamped and maintained in the form of a hollow truncate pyramid, one of said members having an interior frusto-conical blade-engaging surface surrounding the shank portions of the blades, and the other having blade-engaging facets forming a truncate pyramid against which the shank portions of the blades are clamped by said frusto-conical surface.

CORWIN W. BAKER.

No references cited.